Dec. 9, 1969  L. D. SMITH, JR  3,482,597
POLYMER GEL DISINTEGRATOR
Filed May 18, 1967

INVENTOR
LEE DAVIS SMITH, JR.

BY *Howard P. West Jr.*

ATTORNEY ly small in guage to present

United States Patent Office 3,482,597
Patented Dec. 9, 1969

3,482,597
POLYMER GEL DISINTEGRATOR
Lee Davis Smith, Jr., Signal Mountain, Tenn., assignor to E. I. du Pont de Nemours and Company, Wilmington, Del., a corporation of Delaware
Filed May 18, 1967, Ser. No. 639,363
Int. Cl. B01f *3/08, 5/06*
U.S. Cl. 137—544         5 Claims

ABSTRACT OF THE DISCLOSURE

An apparatus for disintegrating large gelatinous particles moving with a liquid stream in a flow conduit. A foraminous shell is positioned in the conduit with the openings in the shell formed to present cutting edges facing upstream.

BACKGROUND OF THE INVENTION

This invention relates to the flow of viscous liquids in conduits and, more particularly, to means for maintaining continuity of flow of viscous polymers from a scurce to a plurality of delivery points.

Systems for distributing liquids from a single source to a plurality of discharge points are well known. As illustrated in Sharp U.S. 3,103,942 or Hart U.S. 3,000,053, the distribution of highly viscous polymeric materials by a branched cascade manifold in melt spinning apparatus is desirable for delivering a uniform supply of fiber-forming material to a multiplicity of spinning positions. Viscous liquids flowing in the conduits of such a system generally flow with a parabolic distribution of fluid velocity across the cross-section of the conduit so that the fluid close to the walls of the conduit moves at a relatively low velocity in comparison with the fluid in the center. Sharp U.S. 3,103,942 provides a device in a distribution manifold for withdrawal of the slow moving fluid lamina near the conduit walls into outlets spaced at intervals along the length of the conduit. In this way, the residence time is equalized among the separate liquid streams. As an alternative, it may be more desirable to use the flow inverter of Boucher and Sakiadis U.S. 3,128,794 to periodically direct the peripheral portion of the flowing stream inward to the central region and simultaneously direct the fluid from the center outwardly toward the conduit walls thereby conducting an interchange between inner and outer streams without turbulence or appreciable mixing and equalizing the residence time among the elements of the moving stream.

Although such distribution systems provide means for supplying fluids of uniform quality to a plurality of spinning positions, these systems are subject to problems in conveying a gel-susceptible material such as a molten polyadipamide. Gel from polyadipamides can be defined as a product of polymer degradation and is presumably produced by the cross-linking of polymer molecules. Polyamide gels may vary from a thickened gelatinous consistency to infusible solid masses. It is known that gel formation can be caused by excessive temperatures or prolonged heating and occurs chiefly in stagnat areas of a distribution system. Occasionally, gel which has formed on the conduit walls during protracted operation of the distribution system will slough or break from the conduit walls as large particles and enter the fluid stream. The large gel particles clog spinneret packs, extruders, pipelines, valves, baffles, pumps, instrument connections and otherwise seriously interfere with the processing of polyadipamides. For example, if a mass of gel becomes lodged in one of the passages in the flow inverter of Boucher and Sakiadis or in one of the manifold outlets of Sharp, the desired polymer flow pattern is not obtained.

STATEMENT OF THE INVENTION

The principal objective of this invention is to provide an apparatus for use with a system for distribution of gel susceptible viscous liquids that will inhibit pluggage of the delivery passages of the system.

This objective is accomplished, in a system wherein the liquid is fed by positive means from a source through a conduit to a plurality of restircted delivery passages, by a foraminous shell positioned in the conduit with the base of the shell facing upstream. The openings in the shell are smaller in cross-sectional dimensions than the delivery passages and are axially disposed toward the base thereby forming a plurality of cutting edges facing upstream. The surface area of the shell is greater than and has a free area at least equal to the cross-sectional area of the conduit.

DETAILED DESCRIPTION OF THE ILLUSTRATED EMBODIMENTS

Figure 1:
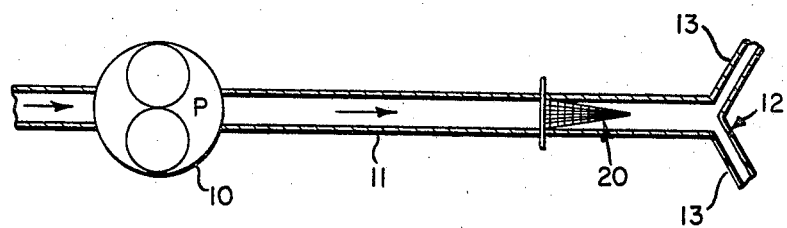
FIG. 1 is a schematic longitudinal diagram of a fluid distribution system showing the apparatus of the present invention in place.

An embodiment of the fluid distribution system of this invention is shown schematically in FIG. 1. Molten fluid from a source is pumped by a suitable positive displacement pump 10 into a conduit 11 and delivered to a distribution device 12 with delivery passages 13. The distributor 12 may be of the type disclosed by Sharp, a flow inverter according to Boucher and Sakiadis or a conventional manifold with restricted outlet pipes. Located a short distance upstream from the distributor 12 is a foraminous shell 20 for disintegrating gelatinous masses moving within the fluid stream.

Figure 2:
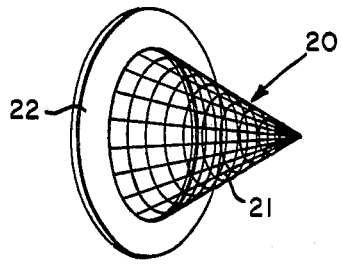
FIG. 2 is one form of the foraminous shell and its supporting member.

FIG. 2 illustrates one form of an apparatus for disintegrating gelatinous masses comprising a conical shell 20 fashioned of a wire mesh 21 and secured at the periphery of its base to a circular flange 22. The inner periphery of the base of shell 20 is approximately the same size and shape as the conduit in which it is to be fitted so as to avoid disruption of the flow pattern along the walls within the conduit 11. Since pipes of circular cross-section are most common, a circular base is shown here. The flange 22 will mount readily within conventional flanged pipe joints. The largest opening in the mesh of the disintegrating device should be no larger than the delivery passages 13 downstream. The free area of the shell should be at least equal to the cross-sectional area of the conduit 11 so that any significant change in fluid velocity is avoided and the pressure drop through the shell 20 is minimized. The wire which forms the mesh must have enough strength to withstand distortional forces while in service. However, the wire must not be so large as to present new sites for gel formation. Moreover, the wire 21 is sufficiently small in guage to present a plurality of cutting edge facing upstream when the shell is positioned in the conduit. As a rule of thumb, a shell 20 should have a total area at least 2 times the cross-sectional area of the conduit and at least 45% free area.

Figure 3:
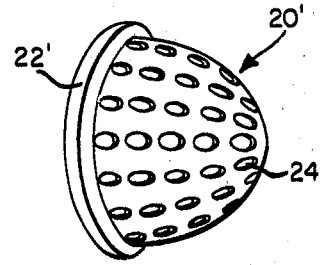
FIG. 3 is another embodiment of the foraminous shell.
Figure 4:
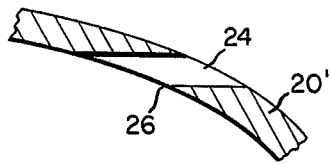
FIG. 4 is an enlarged partial cross-section of FIG. 3 taken through one of the openings in the shell.

The embodiment illustrated in FIGS. 3, 4 includes a foraminous paraboloid shell 20' secured at its base by a flange 22' for mounting within conventional flanged pipe joints in conduit 11. The openings 24 in shell 20' are formed at an acute angle with respect to the surface of the shell and are axially disposed toward the base of the shell 20' to form a plurality of cutting edges 26 (FIG. 4) facing upstream when the shell is positioned in conduit 11.

In operation the pump feeds fluid material continuously through the conduit 11 to the delivery passages 13 where it is controlled by a device responsive to pressure or flow rate. Any gel which forms and breaks free from its point of formation, enters the moving stream and moves with the fluid through the conduit 11. Any gel particle too large to pass through the openings in the shell 20 becomes trapped and presents a restriction to flow, the larger the particle the greater the restriction. With continuing delivery by the feed pump 10, a back pressure is developed on the upstream side within the shell 20, the large gel particles are disintegrated as they are pushed against the wire mesh and through the openings in shell 20. The resulting smaller particles can flow freely on through the delivery passages 13 and out of the distribution system. In a melt spinning system, these smaller particles can be readily filtered out in the conventional spinneret pack assemblies.

While the wire mesh 21 is effective for disintegrating large gel particles the effectiveness of the apparatus is increased when in the form illustrated in FIGS. 3, 4 wherein the cutting surface is in the form of a sharp edge 26 which engages and disintegrates the gel forced against it by pressure developed on the upstream side of the shell.

The shell may readily take other geometric forms such as a frustum of a cone or pyrimidal shapes can be fashioned for use on conduits with rectilinear cross-sections.

Ordinarily one would expect that the installation of the shell 20, within a conduit or transfer line for gel-susceptible materials would adversely affect the flow. On the contrary, it has been found that the device benefits continued operation.

In one run, molten polyamide was being delivered continuously at approximately 600 p.s.i. into a cascade manifold system equipped with flow inverters as disclosed in Boucher and Sakiadis U.S. 3,128,794 and delivered to outlet passages at a pressure of 350 p.s.i. After 58 days of operation, the delivery pressure became erratic and declined to approximately 300 p.s.i. After shutting down the operation and examination of the contents of the distribution system, most of the flow inverters were found to be clogged with large particles of gel which had entered the system. A conical shell as illustrated in FIG. 2 was fabricated of 4½ mesh stainless steel woven wire cloth (.072 inch diameter wire, .150 inch opening, 46% open area) with a 3½ inch diameter circular base and 10 inches long. The shell was installed upstream from the first flow inverter of the above manifold distribution system. Another run of 42 days of continued operation followed, and the system was again shut down and examined. Although no difficulty had been encountered, large gel particles which would have clogged the inverters were found being pressed through the wire mesh. Gelatinous shreds were also noted on filters in the polymer stream issuing from the distribution system, indicating that the shell had functioned as intended in disintegrating large gel particles.

This invention may obviously be used for distribution of gel-susceptible fluids other than polyadipamides.

What is claimed is:

1. In a system for distribution of viscous liquid from a pressurized source through a conduit to a plurality of restricted passages and wherein the liquid tends to gel on the wall of the conduit, the gel then tending to break from the wall as large particles, and enter the moving liquid stream clogging the restricted passages, the improvement comprising:

a foraminous walled shell having a base positioned in said conduit between said source and said restricted passages and facing upstream, the surface area of said shell being at least two times greater than and having a free area at least equal to the cross-sectional area of said conduit, each of the openings in said shell being of uniform cross-section throughout their length through the wall of the shell and smaller in cross-sectional dimension than any of said restricted passages and being formed at an acute angle with respect to the shell wall, thereby forming a plurality of cutting edges facing upstream.

2. The apparatus of claim 1 wherein said shell is conical.

3. The apparatus of claim 1 wherein said shell is a paraboloid.

4. In a system for distribution of gel susceptible viscous liquid from a source through a conduit to a plurality of restricted passages, an apparatus for disintegrating gel which tends to form on and break from the conduit walls as large particles, said apparatus comprising; a conical foraminous walled shell having a base positioned axially in said conduit and facing upstream, said base having an inner periphery conforming to the inner periphery of the conduit, said shell having a surface area of at least two times the cross-sectional area of the conduit and at least 45% free area, each of the openings in said shell being of uniform cross-section throughout their length through the shell wall and smaller in cross-section than any of said restricted passages and being formed at an acute angle with respect to the shell wall.

5. The apparatus of claim 4 wherein said conical shell is formed from wire mesh.

References Cited

UNITED STATES PATENTS

| 1,011,999 | 12/1911 | Parker | 239—553.3 |
| 1,368,120 | 2/1921 | Cole | 239—553.3 |
| 2,647,801 | 8/1953 | Lycan | 239—590.3 |

FOREIGN PATENTS

| 6,631 | 11/1906 | France. |
| 544,008 | 6/1922 | France. |

M. CARY NELSON, Primary Examiner

WILLIAM R. CLINE, Assistant Examiner

U.S. Cl. X.R.

137—561